(12) United States Patent
Shtrom et al.

(10) Patent No.: US 10,833,421 B2
(45) Date of Patent: Nov. 10, 2020

(54) VIRTUAL RADAR ARRAY HAVING REDUCED SIZE

(71) Applicant: Augmented Radar Imaging, Inc., Los Altos, CA (US)

(72) Inventors: Victor Shtrom, Los Altos, CA (US); Todd Gustavson, Sunnyvale, CA (US); Ketan N. Patel, Cupertino, CA (US); Darin T. Milton, Campbell, CA (US); Janine Cheng, San Francisco, CA (US)

(73) Assignee: Augmented Radar Imaging, Inc., Los Altos, CA (US)

( * ) Notice: Subject to any disclaimer, the term of this patent is extended or adjusted under 35 U.S.C. 154(b) by 30 days.

(21) Appl. No.: 16/378,535

(22) Filed: Apr. 8, 2019

(65) Prior Publication Data

US 2020/0321710 A1    Oct. 8, 2020

(51) Int. Cl.
| | | |
|---|---|---|
| *H01Q 21/06* | (2006.01) |
| *H01Q 21/20* | (2006.01) |
| *H04B 7/08* | (2006.01) |
| *H04B 7/06* | (2006.01) |
| *H04B 7/0413* | (2017.01) |

(52) U.S. Cl.
CPC ........... *H01Q 21/061* (2013.01); *H01Q 21/20* (2013.01); *H04B 7/0413* (2013.01); *H04B 7/06* (2013.01); *H04B 7/08* (2013.01)

(58) Field of Classification Search
CPC .... H01Q 21/00; H01Q 21/0025; H01Q 21/06; H01Q 21/061; H01Q 21/20; H01Q 1/3233; G01S 13/00; G01S 13/003; G01S 13/06; G01S 13/42
See application file for complete search history.

(56) References Cited

U.S. PATENT DOCUMENTS

| | | | |
|---|---|---|---|
| 2018/0149735 A1* | 5/2018 | Lim | ........................ H01Q 21/08 |
| 2018/0159246 A1* | 6/2018 | Raphaeli | .............. H01Q 21/061 |

\* cited by examiner

*Primary Examiner* — Hoang V Nguyen
(74) *Attorney, Agent, or Firm* — Steven Stupp

(57) ABSTRACT

A circuit board in an electronic device includes a first set of transmit antennas and a first set of receive antennas arranged along an azimuth direction, and a second set of transmit antennas and a second set of receive antennas arranged along a direction that includes components in the azimuth direction and an elevation direction. Moreover, separations between adjacent transmit antennas in the first or second set of transmit antennas along the azimuth direction may be greater than one half of the fundamental wavelength. Furthermore, separations between adjacent receive antennas in the first or second set of receive antennas along the azimuth direction may equal one half of the fundamental wavelength. Additionally, adjacent antennas in the second set of transmit antennas and the second set of receive antennas may be partially offset from each other and partially overlap with each other along the elevation direction.

20 Claims, 6 Drawing Sheets

VIRTUAL RADAR ARRAY HAVING REDUCED SIZE

BACKGROUND

Field

The described embodiments relate to an electronic device with sets of transmit and receive antennas along azimuth and elevation directions that can provide a virtual antenna array and that are compatible with size constraints of a circuit board in the electronic device.

Related Art

Electromagnetic waves in a radio frequency band (which is henceforth referred to as 'radar') can be used to determine information about one or more objects in an environment. For example, continuous or pulsed radar signals having a fundamental wavelength in the radio frequency band may be transmitted, and reflected radar signals from an object may be received. These reflected radar signals may be analyzed to determine the information, such as a range, an angle and/or a velocity of the object.

In general, in order to improve the spatial resolution of a radar system, larger arrays of transmit or receive antennas are needed. However, increasing the number of transmit or receive antennas typically increases the size, cost and complexity of a radar system. These limitations can be prohibitive.

Alternatively, if the number of transmit or receive antennas is reduced by increasing the spacing or separation between adjacent antennas in an array to be greater than one half of the fundamental wavelength, the spatial resolution of a radar system is often reduced. Moreover, such an increase in the spacing or separation between adjacent antennas in an array usually produced grating lobes (such as replicas of the mainlobe and/or radiation side lobes), which also can degrade the performance of the radar system.

SUMMARY

An electronic device that performs radar measurements is described. This electronic device includes a circuit board having a first dimension in azimuth direction and a second dimension in an elevation direction. Moreover, the circuit board includes: one or more transmitters that provide radar signals having a fundamental wavelength; one or more receivers that receive reflected radar signals having the fundamental wavelength; a first set of transmit antennas communicatively coupled to the one or more transmitters; a first set of receive antennas communicatively coupled to the one or more receivers; a second set of transmit antennas communicatively coupled to the one or more transmitters; and a second set of receive antennas communicatively coupled to the one or more receivers. The first set of transmit antennas may be arranged along the azimuth direction, a given transmit antenna in the first set of transmit antennas may have a length along the elevation direction, and separations between adjacent transmit antennas in the first set of transmit antennas along the azimuth direction may be greater than one half of the fundamental wavelength. Moreover, the first set of receive antennas may be arranged along the azimuth direction, a given receive antenna in the first set of receive antennas may have the length along the elevation direction, and separations between adjacent receive antennas in the first set of receive antennas along the azimuth direction may equal one half of the fundamental wavelength.

Furthermore, the second set of transmit antennas may be arranged along a direction that includes components in the azimuth direction and the elevation direction, a given transmit antenna in the second set of transmit antennas may have the length along the elevation direction, separations between adjacent transmit antennas in the second set of transmit antennas along the azimuth direction may be greater than one half of the fundamental wavelength, and the adjacent transmit antennas in the second set of transmit antennas may be partially offset from each other and partially overlap with each other along the elevation direction. Additionally, the second set of receive antennas may be arranged along the direction, a given receive antenna in the second set of receive antennas may have the length along the elevation direction, separations between adjacent receive antennas in the second set of receive antennas along the azimuth direction may equal one half of the fundamental wavelength, and the adjacent receive antennas in the second set of receive antennas may be partially offset from each other and partially overlap with each other along the elevation direction.

Note that a product of a number of transmit antennas in the second set of transmit antennas and the length along the elevation direction may be greater than the second dimension.

Moreover, the separations between the adjacent transmit antennas in the first set of transmit antennas or the second set of transmit antennas along the azimuth direction may be a non-zero integer multiple of the fundamental wavelength.

Furthermore, using the first set of transmit antennas, the first set of receive antennas, the second set of transmit antennas and the second set of receive antennas, the electronic device may produce a virtual antenna array with virtual antennas separated by no more than one half of the fundamental wavelength along the azimuth direction or the elevation direction. Additionally, the separations of the transmit antennas in the first set of transmit antennas and the second set of transmit antennas and the separations of the receive antennas in the first set of receive antennas and the second set of receive antennas may be selected to suppress grating lobes in the virtual antenna array. For example, the virtual antenna array may not have any grating lobes.

In some embodiments, the first set of transmit antennas may be arranged in a linear array along the azimuth direction.

Moreover, the separations between the transmit antennas in the first set of transmit antennas or the second set of transmit antennas may be uniform. However, in other embodiments, at least some of the separations may be nonuniform or different.

Furthermore, the direction may be at a 45° angle to the azimuth direction and to the elevation direction.

Additionally, the electronic device may use the one or more transmitters, the first set of transmit antennas, the second set of transmit antennas, the one or more receivers, the first set of receive antennas and the second set of receive antennas in a multiple-input multiple-output (MIMO) operating mode. For example, the electronic device may use pairs of transmit and receive antennas in the first set of transmit antennas, the second set of transmit antennas, the first set of receive antennas and the second set of receive antennas when analyzing the reflected radar signals to enhance a spatial resolution of the electronic device, where a given pair may include a given transmit antenna and a given receive antenna. Thus, in some embodiments, the spatial resolution of the electronic device may be less than the separation of the first set of transmit antennas or the second set of transmit antennas along the azimuth direction. Note that the electronic device may encode electrical signals used to drive the first set of transmit antennas and the second set of transmit antennas so that the electrical signals are orthogonal to each other.

Another embodiment provides a computer-readable storage medium for use with the electronic device. This computer-readable storage medium may include program instructions that, when executed by the electronic device, causes the electronic device to perform at least some of the aforementioned operations of the electronic device.

Another embodiment provides a vehicle that includes the electronic device.

Another embodiment provides a method for performing radar measurements using an electronic device. During the method, the electronic device may provide radar signals by driving a first set of transmit antennas and a second set of transmit antennas using one or more transmitters with electrical signals that are orthogonal to each other, where the electrical signals have a fundamental wavelength. Note that the first set of transmit antennas may be arranged along an azimuth direction of a circuit board in the electronic device, a given transmit antenna in the first set of transmit antennas may have a length along an elevation direction of the circuit board, and separations between adjacent transmit antennas in the first set of transmit antennas along the azimuth direction may be greater than one half of the fundamental wavelength. Moreover, the second set of transmit antennas may be arranged along a direction that includes components in the azimuth direction and the elevation direction, a given transmit antenna in the second set of transmit antennas may have the length along the elevation direction, separations between adjacent transmit antennas in the second set of transmit antennas along the azimuth direction may be greater than one half of the fundamental wavelength, and the adjacent transmit antennas in the second set of transmit antennas may be partially offset from each other and partially overlap with each other along the elevation direction.

Then, the electronic device may receive, using a first set of receive antennas, a second set of receive antennas and one or more receivers, reflected radar signals having the fundamental wavelength. Note that the first set of receive antennas may be arranged along the azimuth direction, a given receive antenna in the first set of receive antennas may have the length along the elevation direction, and separations between adjacent receive antennas in the first set of receive antennas along the azimuth direction may equal one half of the fundamental wavelength. Moreover, the second set of receive antennas may be arranged along the direction, a given receive antenna in the second set of receive antennas may have the length along the elevation direction, separations between adjacent receive antennas in the second set of receive antennas along the azimuth direction may equal one half of the fundamental wavelength, and the adjacent receive antennas in the second set of receive antennas may be partially offset from each other and partially overlap with each other along the elevation direction.

Furthermore, the electronic device may use the one or more transmitters, the first set of transmit antennas, the second set of transmit antennas, the one or more receivers, the first set of receive antennas and the second set of receive antennas in a MIMO operating mode to provide a virtual antenna array that enhances a spatial resolution of the electronic device at least along the azimuth direction.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
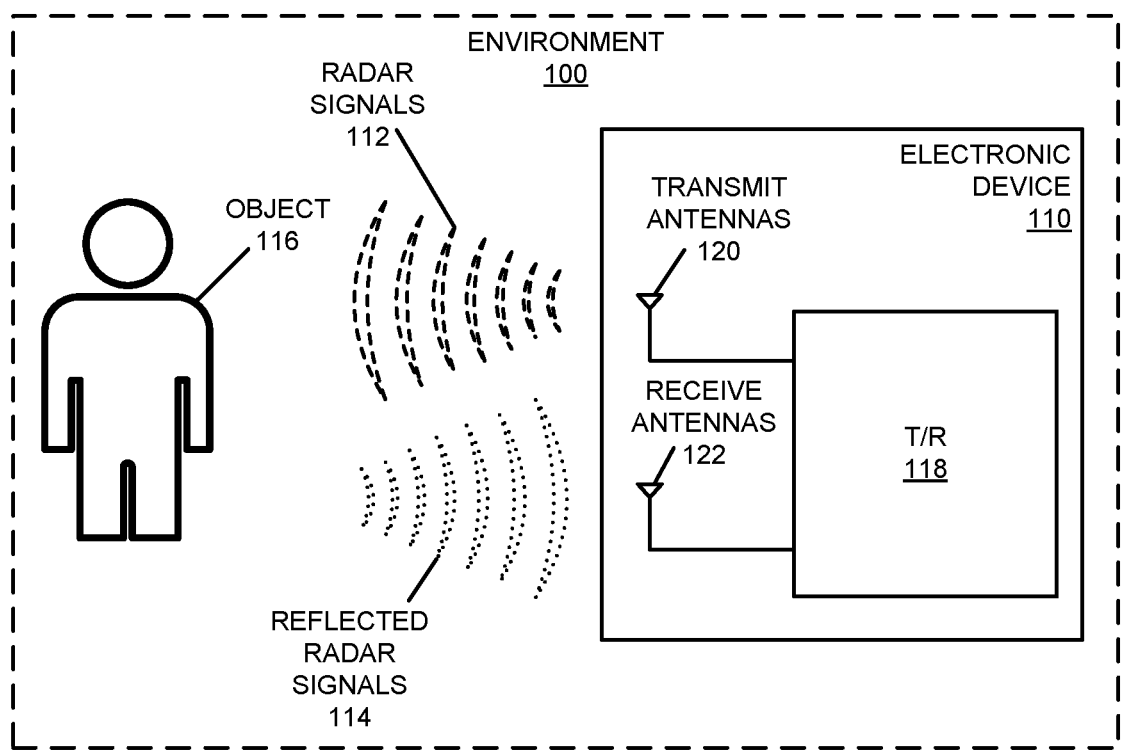
FIG. 1 is a drawing illustrating an example of an environment that includes an electronic device in accordance with an embodiment of the present disclosure.

An electronic device that performs radar measurements using a virtual antenna array is described. A circuit board in an electronic device includes a first set of transmit antennas and a first set of receive antennas arranged along an azimuth direction, and a second set of transmit antennas and a second set of receive antennas arranged along a direction that includes components in the azimuth direction and an elevation direction. Moreover, separations between adjacent transmit antennas in the first or second set of transmit antennas along the azimuth direction may be greater than one half of a fundamental wavelength. Furthermore, separations between adjacent receive antennas in the first or second set of receive antennas along the azimuth direction may equal one half of the fundamental wavelength. Additionally, adjacent antennas in the second set of transmit antennas and the second set of receive antennas may be partially offset from each other and partially overlap with each other along the elevation direction.

During operation, the electronic device may use one or more transmitters on the circuit board, the first set of transmit antennas, the second set of transmit antennas, one or more receivers on the circuit board, the first set of receive antennas and the second set of receive antennas in a MIMO operating mode. For example, the electronic device may use pairs of transmit and receive antennas in the first set of transmit antennas, the second set of transmit antennas, the first set of receive antennas and the second set of receive antennas when analyzing reflected radar signals to enhance a spatial resolution of the electronic device, where a given pair may include a given transmit antenna and a given receive antenna. Thus, in some embodiments, a spatial resolution of the virtual antenna array may be less than the separations of the first set of transmit antennas or the second set of transmit antennas along the azimuth direction. Note that the electronic device may encode electrical signals used to drive the first set of transmit antennas and the second set of antennas so that the electrical signals are orthogonal to each other.

In these ways, the first set of transmit antennas and the second set of transmit antennas may have an increased separation between adjacent transmit antennas and may fit within a dimension of the circuit board along the elevation direction, even though a product of a number of transmit antennas in the second set of transmit antennas and the length of a given transmit antenna along the elevation direction may be greater than the dimension. This capability may reduce the size and cost of the electronic device. Moreover, by using the MIMO operation mode, the electronic device may have a reduced spatial sensitivity (relative to a spatial sensitivity corresponding to the separation between the adjacent transmit antennas in the first set of transmit antennas or the second set of transmit antennas). Consequently, the use of the MIMO operation mode may, at least in part, correct for the reduced spatial sampling associated with the first set of transmit antennas and the second set of transmit antennas, so that the spatial resolution of the electronic device is not adversely affected. Therefore, the electronic device may provide reduced size and cost, while reducing or eliminate an adverse impact on the spatial resolution.

In the discussion that follows, radar is used as an illustrative example of the other sensor technique. For example, the radar may involve radar signals having a fundamental or carrier frequency of 24 GHz, 77-81 GHz or 140 GHz (which corresponds to the fundamental or carrier wavelength of 0.01249 m, 3.8934-3.7011 mm or 2.1414 mm), and/or another electromagnetic signal having a fundamental frequency in the radio or microwave frequency band. Moreover, the radar signals may be continuous wave and/or pulsed, may modulated (such as using frequency modulation or pulse modulation) and/or may be polarized. In particular, the radar signals may be frequency-modulated continuous-wave, pulse-modulated continuous-wave, multiple-input multiple-output (MIMO), etc. However, a wide variety of sensor techniques may be used in conjunction with or to implement the measurement technique. For example, the sensor techniques may include: optical imaging in the visible spectrum or a visible frequency band, infrared, sonar, FLIR, optical imaging having a dynamic range or contrast ratio exceeding a threshold value (such as 120 dB), lidar, etc.

Moreover, in the discussion that follows, the electronic device may communicate using one or more of a wide variety of communication protocols. For example, the communication may involve wired and/or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Tex.), Bluetooth® (from the Bluetooth Special Interest Group of Kirkland, Wash.), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc.

We now describe some embodiments of a measurement technique. FIG. 1 presents a drawing illustrating an example of an environment 100 that includes an electronic device 110. This electronic device may transmit radar signals 112 having a fundamental wavelength (such as a wavelength in a radio frequency band), and may receive reflected radar signals 114 having the fundamental wavelength from one or more objects (such as object 116) in environment 100. For example, electronic device 110 may include one or more transmitters in one or more transceivers (T/R) 118 that provided electrical signals to one or more transmit antennas 120, which radiate the corresponding radar signals 112. Moreover, reflected radar signals 114 may be received by one or more receive antennas 122, which provide corresponding electrical signals to one or more receivers in the one or more transceivers 118.

In some embodiments, a spatial density of transmit antennas 120 and/or receive antennas 122 may be reduced to reduce a cost of electronic device 110. For example, as described further below with reference to FIG. 2, separations or spacings between adjacent antennas in at least some of transmit antennas 120 and/or receive antennas 122 may be greater than one half of the fundamental wavelength. For example, the separations may be a non-zero integer multiple of one half of the fundamental wavelength. In general, this will decrease the spatial resolution of the radar measurements performed by electronic device 110 and may result in grating lobes in antenna patterns associated with transmit antennas 120 and/or receive antennas 122.

In order to reduce or eliminate the reduced spatial resolution and/or the grating lobes, electronic device 110 may use a MIMO operating mode. Notably, the one or more transmitters 120 may concurrently output electrical signals to transmit antennas 120. These electrical signals may be encoded by the one or more transmitters in the one or more transceivers 118 so that they are orthogonal to each other. Moreover, the one or more receivers in the one or more transceivers 118 may concurrently receive the electrical signals corresponding to reflected radar signals 114 from receive antennas 122.

During analysis of the received electrical signals, electronic device 110 may use pairs of transmit antennas 120 and receive antennas 122 (or, equivalently, pairs of electrical signals corresponding to pairs of transmit antennas 120 and receive antennas 122) to create a virtual antenna array with virtual antennas, where a given pair may include or correspond to a given transmit antenna and a given receive antenna. For example, if there are M transmit antennas 120 and N receive antennas 122 (where M and N are non-zero integers), then there may be M×N pairs in the analysis of the received electrical signals. In the process, the virtual antenna array may effectively have an increased number of virtual antennas (relative to the number of transmit antennas 120 and receive antennas 122). Stated differently, the virtual antenna array may have a larger or an increased aperture. Consequently, the virtual antenna array may have an enhanced spatial resolution relative to a spatial resolution corresponding to the separations between adjacent transmit antennas 120 and/or adjacent receive antennas 122. In some embodiments, the spatial resolution of the virtual antenna array (and, this, electronic device 110) may be one half of the fundamental wavelength. In these ways, the virtual antenna array may improve detection of closely spaced objects in environment 100, and may provide improved imaging quality (such as improved contour detection and identification of individual objects, e.g., object 116).

One challenge with implementing an array of antennas is that the finite size of the individual antennas. For example, typically an antenna has a spatial extent or dimension that is comparable to or that corresponds to the fundamental wavelength. Moreover, in order to provide two-dimensional (2D) coverage or detection capability (such as in an azimuth or horizontal direction, and in an elevation or vertical direction), a 2D array of transmit antennas 120 and receive antennas 122 may be used. However, it can be difficult to accommodate the spatial extent of the individual antennas when multiple antennas are included along a direction (such as the azimuth or the elevation direction) in an array of antennas. Notably, if arranged end-to-end, the antennas along a given direction may be longer than a dimension or size of a circuit board in electronic device 110.

In order to address this problem, the antennas corresponding to at least one of the directions in the array may be staggered and offset from each other. In this way, a total length of the antennas along at least one of the directions in the array may be less than a product of a number of antennas (such as transmit or receive antennas) in electronic device 110 and the length of the individual antennas along at least one of the directions in the array.

Figure 2:
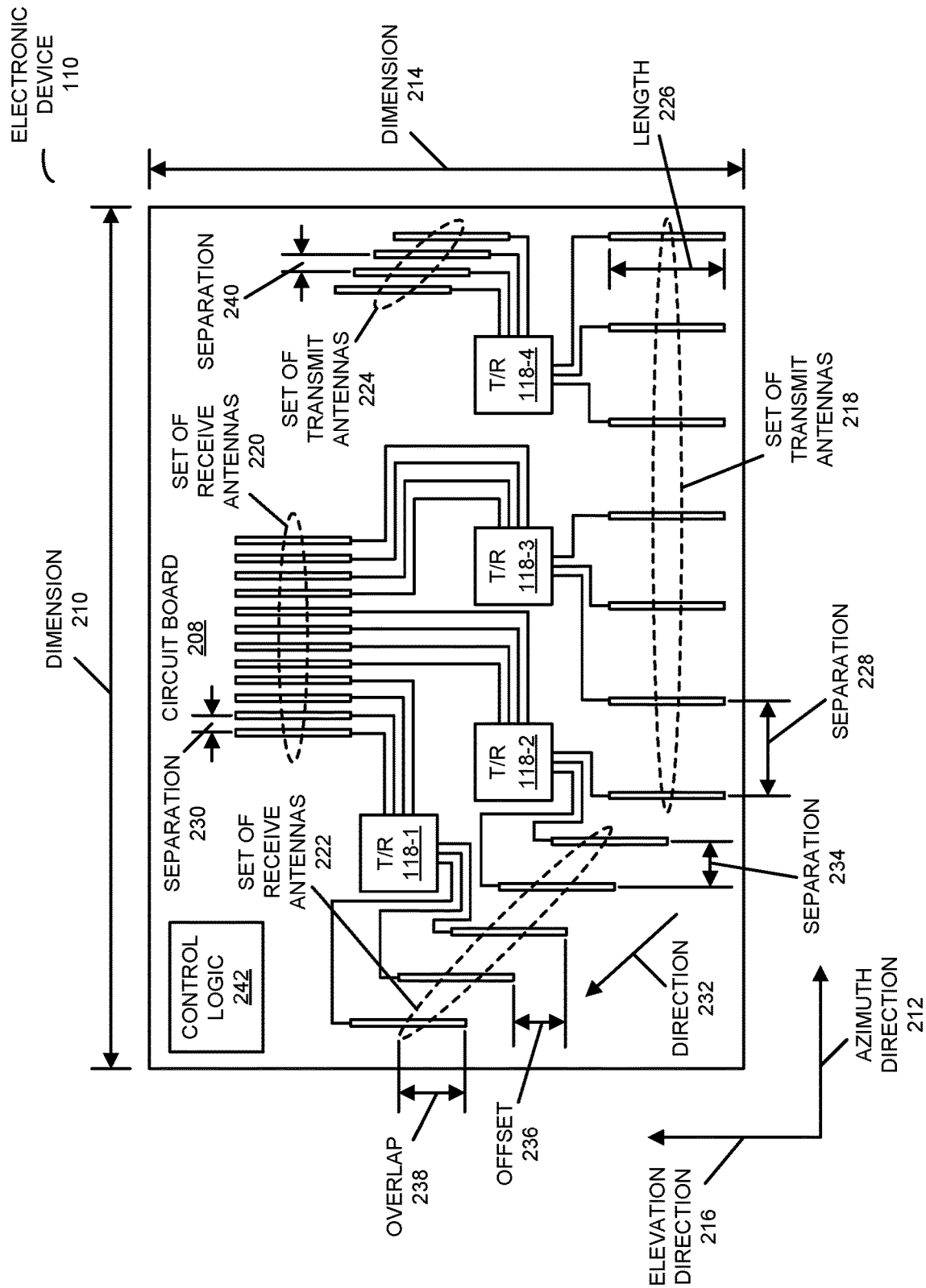
FIG. 2 is a drawing illustrating an example of the electronic device of FIG. 1 in accordance with an embodiment of the present disclosure.

This is shown in FIG. 2, which presents a drawing illustrating an example of electronic device 110. Electronic device 110 may include a circuit board 208 having a dimension 210 (such as a width) in azimuth direction 212 and a dimension 214 (such as a height) in an elevation direction 216. Moreover, circuit board 208 may include: one or more transmitters in the one or more transceivers 118 that provide radar signals having a fundamental wavelength; one or more receivers in the one or more transceivers 118 that receive reflected radar signals having the fundamental wavelength; a set of transmit antennas 218 communicatively coupled to the one or more transmitters in the one or more transceivers 118 (e.g., by connections or signal lines, such as connection 206); a set of receive antennas 220 communicatively coupled to the one or more receivers in the one or more transceivers 118 (e.g., by connections or signal lines); a set of transmit antennas 222 communicatively coupled to the one or more transmitters in the one or more transceivers 118 (e.g., by connections or signal lines); and set of receive antennas 224 communicatively coupled to the one or more receivers in the one or more transceivers 118 (e.g., by connections or signal lines).

The set of transmit antennas 218 may be arranged along azimuth direction 212, a given transmit antenna in the set of transmit antennas 218 may have a length 226 along elevation direction 216, and separations between adjacent transmit antennas in the set of transmit antennas 218 along azimuth direction 212 (such as separation 228) may be greater than one half of the fundamental wavelength. For example, the set of transmit antennas 218 may be arranged in a linear array along azimuth direction 212. Moreover, the set of receive antennas 220 may be arranged along azimuth direction 212, a given receive antenna in the set of receive 220 antennas may have length 226 along elevation direction 216, and separations between adjacent receive antennas in the set of receive antennas 220 along azimuth direction 212 (such as separation 230) may equal one half of the fundamental wavelength.

Furthermore, the set of transmit antennas 222 may be arranged along a direction 232 that includes components in azimuth direction 212 and elevation direction 216, a given transmit antenna in the set of transmit antennas 222 may have length 226 along elevation direction 216, separations between adjacent transmit antennas in the set of transmit antennas 222 along azimuth direction 212 (such as separation 234) may be greater than one half of the fundamental wavelength, and the adjacent transmit antennas in the set of transmit antennas 222 may be partially offset (such as offset 236) from each other and partially overlap (such as overlap 238) with each other along elevation direction 216. Additionally, the set of receive antennas 224 may be arranged along direction 232, a given receive antenna in the set of receive antennas 224 may have length 226 along elevation direction 216, separations between adjacent receive antennas in the set of receive antennas 224 along azimuth direction 212 (such as separation 240) may equal one half of the fundamental wavelength, and the adjacent receive antennas in the set of receive antennas 224 may be partially offset (such as offset 236) from each other and partially overlap (such as overlap 238) with each other along elevation direction 216. For example, direction 232 may be at a 45° angle to azimuth direction 212 and to elevation direction 216.

Note that a product of a number of transmit antennas in the set of transmit antennas 222 and length 226 along elevation direction 216 may be greater than dimension 214.

Moreover, the separations between the adjacent transmit antennas in the set of transmit antennas 218 or the set of transmit antennas 222 along azimuth direction 212 may be a non-zero integer multiple of the fundamental wavelength.

Furthermore, the separations between the transmit antennas in the set of transmit antennas 218, the set of receive antennas 220, the set of transmit antennas 222 and/or the set of receive antennas 224 may be uniform. However, in other embodiments, at least some of the separations may be nonuniform or different from other separations.

Additionally, electronic device 110 may include control logic 242, such as an integrated circuit and/or a processor. (Alternatively, at least some functions of control logic 242 may be implemented by at least some of the one or more transmitters in the one or more transceivers 118 and/or the one or more receivers in the one or more transceivers 118. Thus, at least some functions of control logic 242 may be distributed and performed by other components in electronic device 110.)

Figure 3:
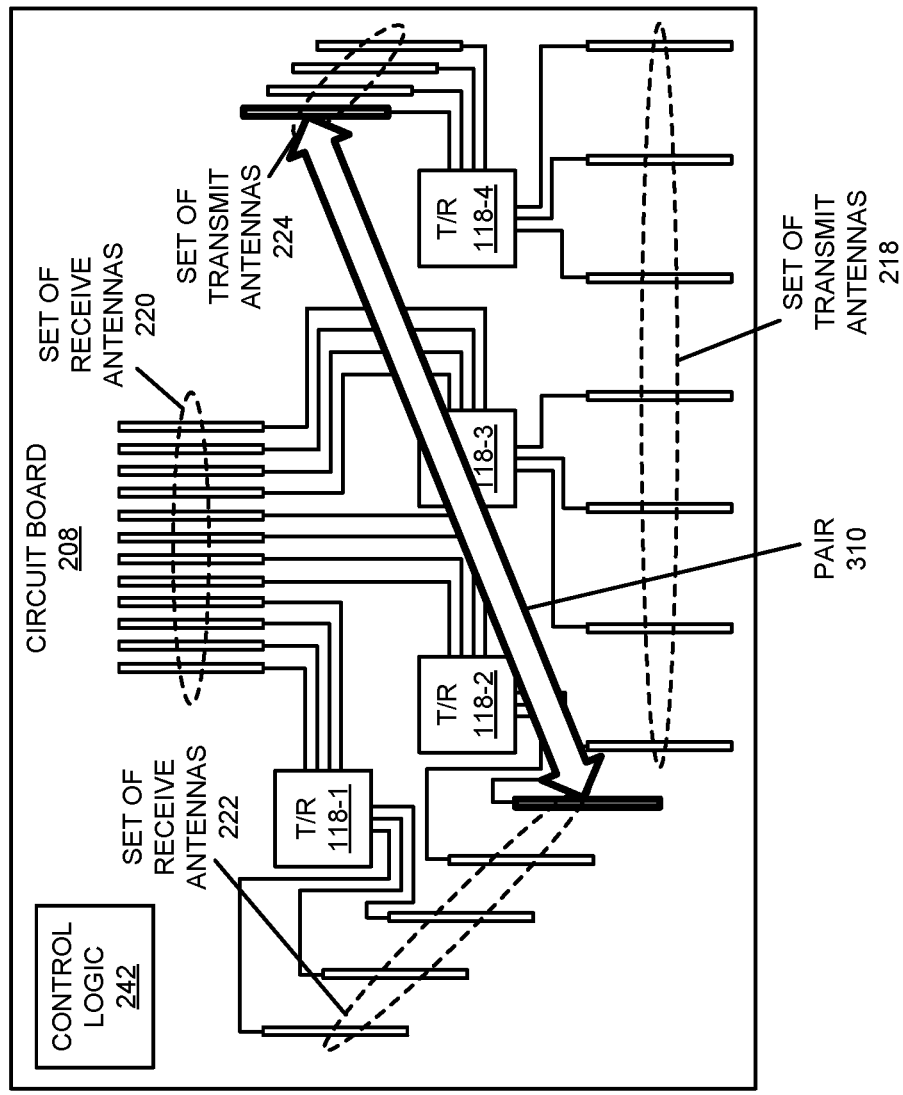
FIG. 3 is a drawing illustrating an example of operation of the electronic device of FIGS. 1 and 2 to create a virtual antenna array in accordance with an embodiment of the present disclosure.

As shown in FIG. 3, which presents a drawing illustrating an example of operation of electronic device 110, control logic 242 may use the one or more transmitters in the one or more transceivers 118, the set of transmit antennas 218, the set of transmit antennas 222, the one or more receivers in the one or more transceivers 118, the set of receive antennas 220 and the set of receive antennas 224 in a multiple-input multiple-output (MIMO) operating mode. For example, control logic 242 may use pairs of transmit and receive antennas in the set of transmit antennas 218, the set of transmit antennas 222, the set of receive antennas 220 and the set of receive antennas 224 (such as pair 310) when analyzing the reflected radar signals to enhance a spatial resolution of electronic device 110, where a given pair may include a given transmit antenna and a given receive antenna. Stated differently, control logic 242 may use the set of transmit antennas 218, the set of receive antennas 220, the set of transmit antennas 222 and the set of receive antennas 224 to produce a virtual antenna array with virtual antennas separated by no more than one half of the fundamental wavelength along azimuth direction 212 or elevation direction 216. Thus, in some embodiments, the spatial resolution of electronic device 110 may be less than the separation of the set of transmit antennas 218 or the set of transmit antennas 222 along azimuth direction 212.

Notably, electronic device 110 (such as the one or more transmitters in the one or more transceivers 118) may encode electrical signals used to drive the set of transmit antennas 218 and the set of transmit antennas 222 so that the electrical signals are orthogonal to each other. For example, the encoding may include a type of phase-shift keying, such as binary phase-shift keying. This may allow the corresponding received reflected radar signals to be identified and separated (e.g., using filters) during the analysis of the received reflected radar signals. For example, the electrical signals used to drive each of the set of transmit antennas 218 and the set of transmit antennas 222 may be distinguishable from every other transmitter by using appropriate differences in the modulation, such as different digital code sequences. The electrical signals received by each of the receive antennas may be correlated with each of these electrical signals, producing a number of correlated outputs equal to the product of the number of receiver antennas with the number of transmitter antennas. The resulting outputs may be equivalent to those produced by a number of virtual antennas, which can exceed the number of physical antennas. In general, if there are N transmit antennas and M receive antennas (where N and M are non-zero integers), there will be N×M virtual antennas, one for each transmitter-receiver pair.

In some embodiments, the set of transmit antennas 218 includes 7 transmit antennas and the set of transmit antennas 222 includes 5 transmit antennas (thus, N is 12). Moreover, the set of receive antennas 220 includes 12 receive antennas and the set of receive antennas 224 includes 4 receive antennas (thus, M is 16). Consequently, in these embodiments, there may be 12×16 or 192 pairs. Moreover, length 226 may be 22.86 mm, separation 228 may be 23.832 mm (i.e., 12 times one half of the fundamental wavelength or 1.986 mm), separation 234 may be 7.944 mm (i.e., 4 times one half of the fundamental wavelength or 1.986 mm), separation 230 may be 1.986 mm (i.e., one half of the fundamental wavelength or 1.986 mm), separation 240 may be 1.986 mm, offset 236 may be 15.2 mm and overlap 238 may be 7.66 mm. However, these numerical values are for illustrative purposes, and in other embodiments different numerical values may be used.

Referring back to FIG. 2, note that the spatial distribution of the virtual antennas may be given by the spatial convolution of the positions of the transmit antennas and receive antennas. Stated different, for a given physical antenna configuration, the virtual antenna array may be determined by the relative locations of the transmit antennas to each other and the relative locations of the receive antennas to each other (but not the relative locations of the transmit antennas to the receive antennas). Consequently, the position of a given set of transmit antennas relative to the position of a given set of receive antennas can be adapted as needed to tailor the dimensions 210 and 214 of circuit board 208 without affecting the resulting virtual antenna array.

Moreover, note that the separations of the transmit antennas in the set of transmit antennas 218 and the set of transmit antennas 222 and the separations of the receive antennas in the set of receive antennas 220 and the set of receive antennas 224 may be selected to suppress grating lobes in the virtual antenna array. For example, the virtual antenna array may not have any grating lobes.

While the preceding embodiments illustrated a particular configuration of the transmit antennas and the receive antennas, more generally the transmit antennas and the receive antennas in electronic device 110 may be designed to generated and receive radar signals having a polarization. This polarization may be along a different direction than elevation direction 216. Thus, in other embodiments, the transmit and the receive antennas in electronic device may not be aligned with elevation direction 216.

Furthermore, while the set of transmit antennas 222 and the set of receive antennas 224 are offset and staggered along direction 232, in other embodiments either or both of the set of transmit antennas 218 and the set of transmit antennas 222 may be offset and staggered along such a direction. Alternatively or additionally, either of both of the set of receive antennas 220 and the set of receive antennas 224 may be offset and staggered along such a direction. In general, this direction may have a value between 0 and 90° (i.e., it may have components along azimuth direction 212 and elevation direction 216). In this way, the measurement technique may allow the transmit and receive antennas to be accommodated on different sized circuit boards. Notably, at least some of the transmit antennas and/or the receive antennas may be placed in a manner that reduces the physical size of circuit board 210 needed to synthesize a virtual antenna array in both azimuth direction 212 and elevation direction 216.

Additionally, while separate transmit and receive antennas are illustrated in FIG. 2, in other embodiments at least some antennas may be shared between transmit and receive operations (i.e., duplex operation).

While particular separations between adjacent transmit antennas and receive antennas are shown in FIG. 2, in other embodiments different separations may be used. In general, the separations between adjacent transmit antennas may be a first non-zero integer multiple of one half of the fundamental wavelength, and the separations between adjacent receive antennas may be a second non-zero integer multiple of one half of the fundamental wavelength, where the first and the second non-zero integers may be the same or different from each other.

In some embodiments, the transmit antennas and/or the receive antennas may include single or multiple radiators depending on the gain and beam width of a particular MIMO antenna configuration. In general, the transmit antennas and/or the receive antennas may have the same or different sizes. Moreover, the transmit antennas and/or the receive antennas may incorporate the same or different number and/or configurations of radiators. Note that the size of the individual transmit antennas and receive antennas may constrain the minimum separation or spacing between their phase centers or virtual antennas in the virtual antenna array.

Furthermore, the transmit antennas and the receive antennas may be implemented using a wide variety of antenna structures and fabrication techniques, including multi-layer printed circuit board antennas with: microstrip feed lines and patch radiators, substrate integrated waveguide (SIW) feed lines and SIW slotted radiators, coplanar waveguide feed lines with SIW slotted radiators and/or other types of feed and radiator structures. In some embodiments, the transmit antennas and/or the receive antennas include high-gain antennas.

In some embodiments, the transmit antennas have 6-30 dB gain, a beam width between a few degrees and 180°, a transmit power of up to 12 dBm, and an effective range of 200-250 m.

While connections between components in electronic device 110 are illustrated with straight lines, in other embodiments the connections may be curved or may intentionally include serpentine segments in order to reduce cross-talk and inductive pick up.

Moreover, while electronic device 110 is illustrated with one or more transceivers 118, in other embodiments the one or more transceivers 118 may be replaced with one or more transmitters and one or more receivers (i.e., separate transmit and receive components).

While processing the received reflected radar signals, electronic device 110 (such as control logic 242) may perform additional operations to extract or determine information. For example, electronic device 110 may perform windowing or filtering, one or more Fourier or discrete Fourier transforms (with at least 128 or 256 bits), peak detection, etc. In some embodiments, a constant false alarm rate (CFAR) technique is used to identify or determine whether a peak in the received reflected radar signals is significant. Notably, electronic device 110 may calculate statistical metrics (such as a mean and a standard deviation) for a given range, and electronic device 110 may determine if a given peak is significant based on the calculated statistical metrics at different ranges. This approach may allow electronic device 110 to statistically identify or determine information associated with an object (such as object 116).

Moreover, electronic device 110 (such as control logic 242) may extract a signature associated with the object from the received reflected radar signals. The resulting signature of the object may include multiple dimensions. For example, the signature may include one or more of: a range to the object (such as time-of-flight information), a first angle to the object along a first axis (such as azimuth direction 212), Doppler information associated with the object (such as velocity information) and/or a second angle to the object along a second axis (such as elevation direction 216). Some or all of this information may be stored locally in electronic device 110 and/or remotely in a computer-readable memory.

Figure 4:
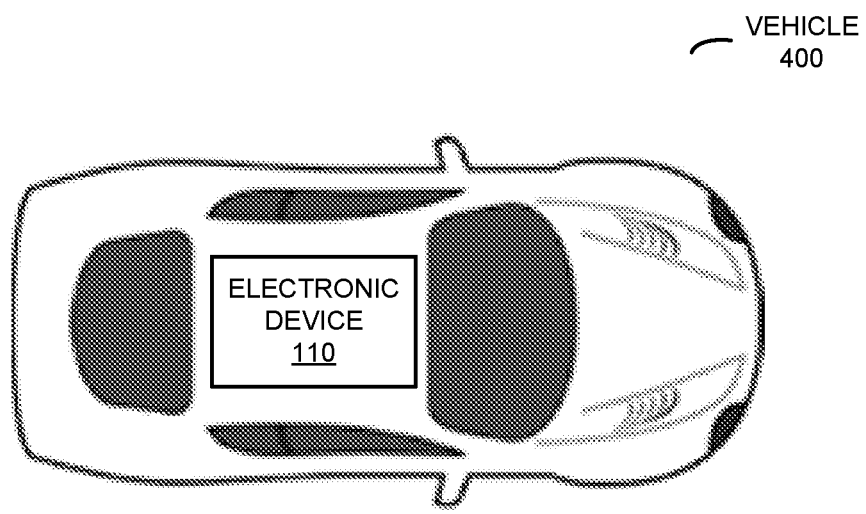
FIG. 4 is a drawing illustrating an example of a vehicle that includes the electronic device of FIGS. 1 and 2 in accordance with an embodiment of the present disclosure.

Electronic device 110 may be used in a wide variety of applications. For example, electronic device 110 may be used in a vehicle. This is shown in FIG. 4, which presents a drawing illustrating an example of a vehicle 400 that includes at least one instance of electronic device 110. Vehicle 400 may include: a car or automobile, a bus, a truck, etc., and more generally one that includes one or more non-retractable wheels in contact with a surface (such as a road or the ground) during operation.

During operation of vehicle 400 (such as while vehicle 400 moves through an environment), one or more different types of sensors may collect information. The results measurements may be separately or in conjunction with each other to facilitate operation of vehicle 400. For example, information acquired by electronic device 110 may be used: to provide object detection, adaptive cruise control, an Advanced Driver Assistance System (ADAS), a safety function (such as forward and side collision warning and avoidance), automated parking, partial autonomous driving functions (such as a traffic jam pilot or a highway pilot) and/or fully autonomous driving.

For example, electronic device 110 may collect radar information. In some embodiments, electronic device 110 and/or vehicle 400 includes one or more imaging sensors that perform optical imaging in a visible spectrum or a visible frequency band (such as at least a frequency between 430 and 770 THz or at least a wavelength between 390 and 700 nm). More generally, the different sensors may include: a radar sensor (such as a MIMO radar sensor), an optical imaging sensor in the visible spectrum or the visible frequency band, an infrared sensor, a FLIR sensor, a sonar sensor, an optical imaging sensor having a dynamic range or contrast ratio exceeding a threshold value (such as 120 dB), lidar, etc. Note that a given sensor may be capable of transmitting and/or receiving signals.

While the one or more different types of sensors may be included in electronic device 110, in other embodiments at least some of the sensors may be coupled to electronic device 110, such as by electrical signal lines, optical signal lines, a cable and/or a bus.

Note that electronic device 110 may be positioned on or proximate to a surface vehicle 400 (such as a front, back or side surface). Alternatively, electronic device 110 may be mounted or positioned on a top surface (such as a roof) of vehicle 1100 and an aperture of electronic device 110 may rotate about a vertical axis, so that it 'sweeps' an arc (e.g., 120°, 180° or 360°).

In some embodiments, electronic device 110 (FIGS. 1-4) and/or vehicle 400 includes fewer or additional components, two or more components are combined into a single component and/or positions of one or more components are changed. Note that, for a given antenna configuration, interchanging the transmit antennas and the receive antennas may result in the same virtual antenna array.

Figure 5:
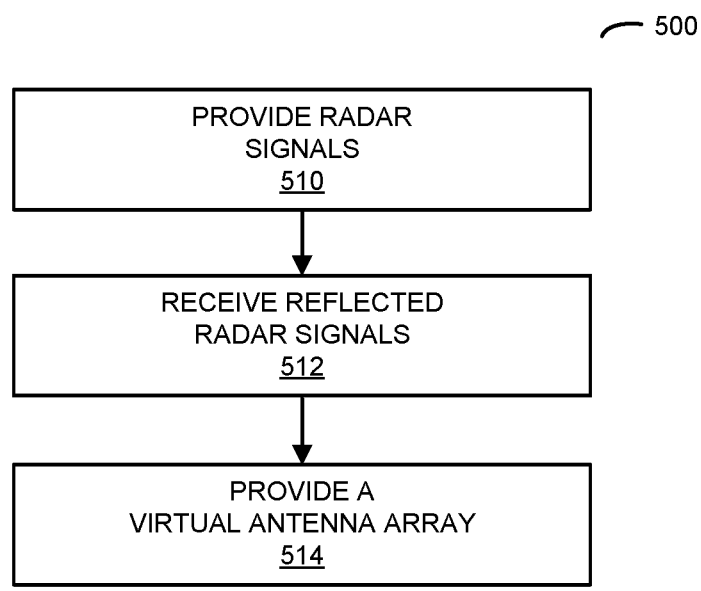
FIG. 5 is a flow diagram illustrating an example of a method for performing radar measurements in accordance with an embodiment of the present disclosure.

FIG. 5 presents a flow diagram illustrating an example of a method 500 for performing radar measurements. This method may be performed by an electronic device (such as electronic device 110 in FIGS. 1 and 2) or a component in the electronic device (such as an integrated circuit or a processor). During operation, the electronic device may provide radar signals (operation 510) by driving a first set of transmit antennas and a second set of transmit antennas using one or more transmitters with electrical signals that are orthogonal to each other, where the electrical signals have a fundamental wavelength. Note that the first set of transmit antennas may be arranged along an azimuth direction of a circuit board in the electronic device, a given transmit antenna in the first set of transmit antennas may have a length along an elevation direction of the circuit board, and separations between adjacent transmit antennas in the first set of transmit antennas along the azimuth direction may be greater than one half of the fundamental wavelength. Moreover, the second set of transmit antennas may be arranged along a direction that includes components in the azimuth direction and the elevation direction, a given transmit antenna in the second set of transmit antennas may have the length along the elevation direction, separations between adjacent transmit antennas in the second set of transmit antennas along the azimuth direction may be greater than one half of the fundamental wavelength, and the adjacent transmit antennas in the second set of transmit antennas may be partially offset from each other and partially overlap with each other along the elevation direction.

Then, the electronic device may receive, using a first set of receive antennas, a second set of receive antennas and one or more receivers, reflected radar signals (operation 512) having the fundamental wavelength. Note that the first set of receive antennas may be arranged along the azimuth direction, a given receive antenna in the first set of receive antennas may have the length along the elevation direction, and separations between adjacent receive antennas in the first set of receive antennas along the azimuth direction may equal one half of the fundamental wavelength. Moreover, the second set of receive antennas may be arranged along the direction, a given receive antenna in the second set of receive antennas may have the length along the elevation direction, separations between adjacent receive antennas in the second set of receive antennas along the azimuth direction may equal one half of the fundamental wavelength, and the adjacent receive antennas in the second set of receive antennas may be partially offset from each other and partially overlap with each other along the elevation direction.

Furthermore, the electronic device may use the one or more transmitters, the first set of transmit antennas, the second set of transmit antennas, the one or more receivers, the first set of receive antennas and the second set of receive antennas in a MIMO operating mode to provide a virtual antenna array (operation 514) that enhances a spatial resolution of the electronic device at least along the azimuth direction. For example, the electronic device may analyze the received reflected radar signals in pairs corresponding to pairs of transmit antennas and receive antennas in order to provide the virtual antenna array.

In some embodiments of method 500 there may be additional or fewer operations. Moreover, the order of the operations may be changed, and/or two or more operations may be combined into a single operation.

Figure 6:
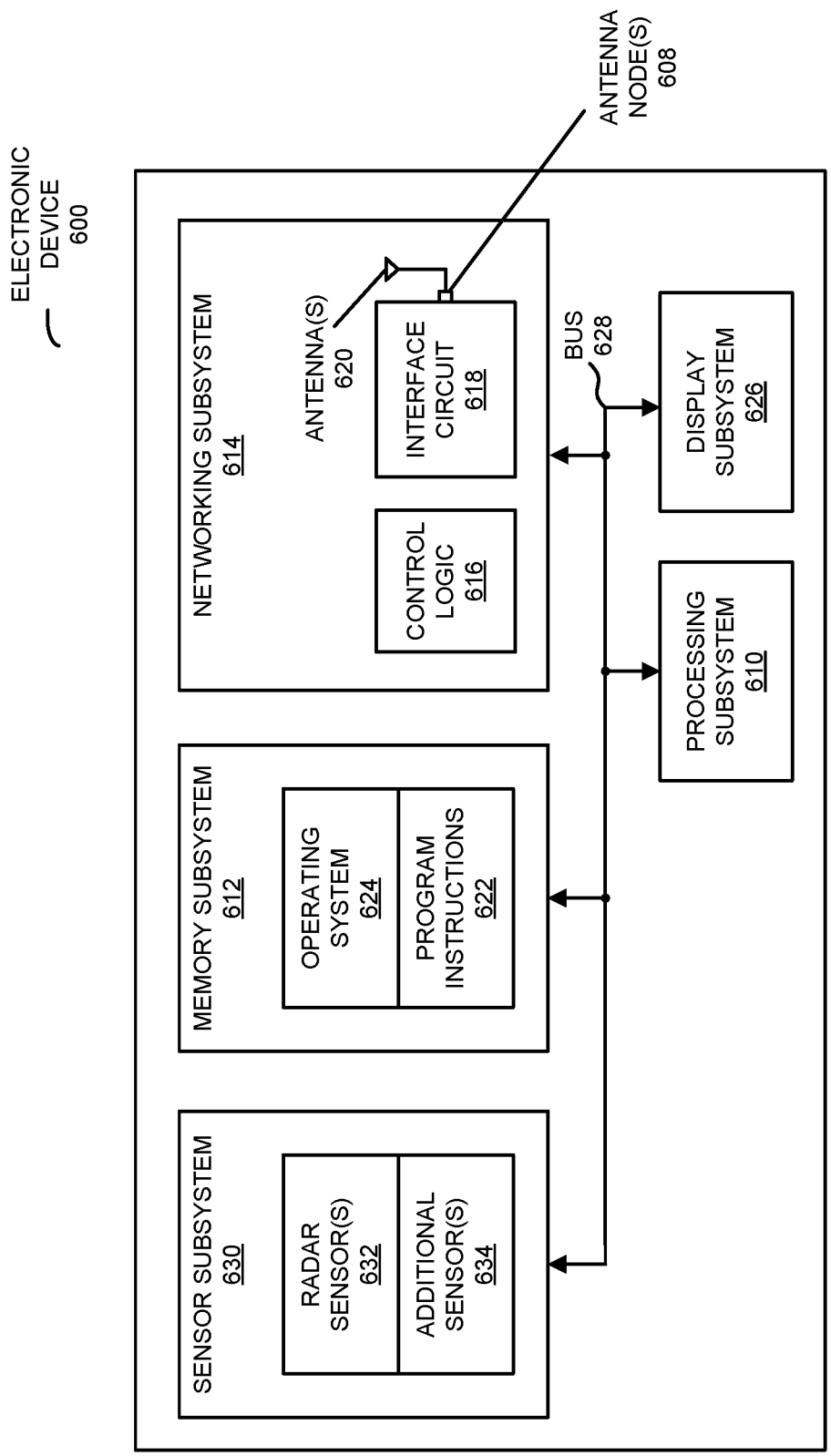
FIG. 6 is a block diagram illustrating an example of an electronic device in accordance with an embodiment of the present disclosure.

We now describe embodiments of an electronic device, which may perform at least some of the operations in the measurement technique. FIG. 6 presents a block diagram illustrating an example of an electronic device 600, such as electronic device 110 (FIGS. 1-3). This electronic device may include processing subsystem 610, memory subsystem 612, networking subsystem 614 and sensor subsystem 630. Processing subsystem 610 includes one or more devices configured to perform computational operations. For example, processing subsystem 610 can include one or more microprocessors, ASICs, microcontrollers, programmable-logic devices, graphical processor units (GPUs) and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory (which collectively or individually are sometimes referred to as a 'computer-readable storage medium'). In some embodiments, instructions for processing subsystem 610 in memory subsystem 612 include: one or more program modules or sets of instructions (such as program instructions 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as nodes 608, e.g., a pad, which can be coupled to the one or more antennas 620. Thus, electronic device 600 may or may not include the one or more antennas 620.) For example, networking subsystem 614 can include a Bluetooth networking system, a cellular networking system (e.g., a 3G/4G network such as UMTS, LTE, etc.), a USB networking system, a networking system based on the standards described in IEEE 802.11 (e.g., a Wi-Fi networking system), an Ethernet networking system, and/or another networking system.

Note that a transmit or receive antenna pattern (or antenna radiation pattern) of electronic device 600 may be adapted or changed using pattern shapers (such as reflectors) in one or more antennas 620 (or antenna elements), which can be independently and selectively electrically coupled to ground to steer the transmit antenna pattern in different directions. (Alternatively or additionally, the transmit or receive antenna pattern may be adapted or changed using a phased array.) Thus, if one or more antennas 620 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 600 that is of interest, and one or more local minima that reduce gain in the direction of other electronic devices that are not of interest. In this way, the given antenna pattern may be selected, e.g., to target an object of interest in an environment of electronic device 600.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting frames and/or scanning for frames transmitted by other electronic devices.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes an optional display subsystem 626 for displaying information on a display, which may include a display driver and the display, such as a liquid-crystal display, a multi-touch touchscreen, etc.

Furthermore, electronic device 600 may include a sensor subsystem 630, which may include one or more radar sensors 632 with one or more transmitters, one or more receivers, one or more sets of transmit antennas and one or more sets of receive antennas that perform MIMO radar measurements. In some embodiments, sensor subsystem 630 includes one or more image sensors that acquire images (such as a CCD or a CMOS sensor) and/or one or more additional sensors 634 (such as a light-intensity sensor, radar, sonar, lidar, etc.). These other or additional sensors may be used separately or in conjunction with the one or more radar sensors 632.

Electronic device 600 can be (or can be included in) a wide variety of electronic devices. For example, electronic device 600 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, a transceiver, a measurement device, another electronic device and/or a vehicle.

Although specific components are used to describe electronic device 600, in alternative embodiments, different components and/or subsystems may be present in electronic device 600. For example, electronic device 600 may include one or more additional processing subsystems, memory subsystems, networking subsystems, display subsystems and/or sensor subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 614 or sensor subsystem 630. The integrated circuit may include hardware and/or software mechanisms that are used for transmitting wireless or radar signals from electronic device 600 and receiving wireless or radar signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

Moreover, another integrated circuit may implement some or all of the functionality related to the measurement technique.

In some embodiments, an output of a process for designing a given integrated circuit, or a portion of the given integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the given integrated circuit or the portion of the given integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the measurement technique may be implemented using program instructions 622, operating system 624 (such as a driver for interface circuit 618) or in firmware in interface circuit 618. Alternatively or additionally, at least some of the operations in the measurement technique may be implemented in a physical layer, such as hardware in interface circuit 618 or sensor subsystem 630.

While the preceding embodiments illustrated the use of a vehicle, such as a car, a truck, a bus, etc., in other embodiments the one or more measurement techniques are used in conjunction with a flying vehicle (such as a drone, a helicopter, an airplane, etc.), a boat or a ship, and/or a submersible vehicle (such as a drone or a submarine).

In the preceding description, we refer to 'some embodiments.' Note that 'some embodiments' describes a subset of all of the possible embodiments, but does not always specify the same subset of embodiments. Note that numerical values in the preceding embodiments are illustrative examples of some embodiments. In other embodiments of the measurement technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a circuit board having a first dimension in azimuth direction and a second dimension in an elevation direction;
   one or more transmitters, disposed on the circuit board, configured to provide radar signals having a fundamental wavelength;
   one or more receivers, disposed on the circuit board, configured to receive reflected radar signals having the fundamental wavelength;
   a first set of transmit antennas disposed on the circuit board and communicatively coupled to the one or more transmitters, wherein the first set of transmit antennas are arranged along the azimuth direction, a given transmit antenna in the first set of transmit antennas has a length along the elevation direction, and separations between adjacent transmit antennas in the first set of transmit antennas along the azimuth direction is greater than one half of the fundamental wavelength;
   a first set of receive antennas disposed on the circuit board and communicatively coupled to the one or more receivers, wherein the first set of receive antennas are arranged along the azimuth direction, a given receive antenna in the first set of receive antennas has the length along the elevation direction, and separations between adjacent receive antennas in the first set of receive antennas along the azimuth direction equals one half of the fundamental wavelength;
   a second set of transmit antennas disposed on the circuit board and communicatively coupled to the one or more transmitters, wherein the second set of transmit antennas are arranged along a direction that includes components in the azimuth direction and the elevation direction, a given transmit antenna in the second set of transmit antennas has the length along the elevation direction, separations between adjacent transmit antennas in the second set of transmit antennas along the azimuth direction is greater than one half of the fundamental wavelength, and the adjacent transmit antennas in the second set of transmit antennas are partially offset from each other and partially overlap with each other along the elevation direction; and
   a second set of receive antennas disposed on the circuit board and communicatively coupled to the one or more receivers, wherein the second set of receive antennas are arranged along the direction, a given receive antenna in the second set of receive antennas has the length along the elevation direction, separations between adjacent receive antennas in the second set of receive antennas along the azimuth direction equals one half of the fundamental wavelength, and the adjacent receive antennas in the second set of receive antennas are partially offset from each other and partially overlap with each other along the elevation direction.

2. The electronic device of claim 1, wherein a product of a number of transmit antennas in the second set of transmit antennas and the length along the elevation direction is greater than the second dimension.

3. The electronic device of claim 1, wherein the separations between the adjacent transmit antennas in the first set of transmit antennas or the second set of transmit antennas along the azimuth direction are a non-zero integer multiple of the fundamental wavelength.

4. The electronic device of claim 1, wherein, using the first set of transmit antennas, the first set of receive antennas, the second set of transmit antennas and the second set of receive antennas, the electronic device is configured to produce a virtual antenna array with virtual antennas separated by no more than one half of the fundamental wavelength along the azimuth direction or the elevation direction.

5. The electronic device of claim 4, wherein the separations of the transmit antennas in the first set of transmit antennas and the second set of transmit antennas and the separations of the receive antennas in the first set of receive antennas and the second set of receive antennas are selected to suppress grating lobes in the virtual antenna array.

6. The electronic device of claim 5, wherein the virtual antenna array comprises no grating lobes.

7. The electronic device of claim 1, wherein the first set of transmit antennas are arranged in a linear array along the azimuth direction.

8. The electronic device of claim 1, wherein the separations between the transmit antennas in the first set of transmit antennas or the second set of transmit antennas are uniform.

9. The electronic device of claim 1, wherein the separations between the receive antennas in the first set of receive antennas or the second set of receive antennas are uniform.

10. The electronic device of claim 1, wherein the direction is at a 45° angle to the azimuth direction and to the elevation direction.

11. The electronic device of claim 1, wherein the electronic device is configured to use the one or more transmitters, the first set of transmit antennas, the second set of transmit antennas, the one or more receivers, the first set of receive antennas and the second set of receive antennas in a multiple-input multiple-output (MIMO) operating mode.

12. The electronic device of claim 1, wherein the electronic device is configured to use pairs of transmit and receive antennas in the first set of transmit antennas, the second set of transmit antennas, the first set of receive antennas and the second set of receive antennas when analyzing the reflected radar signals to enhance a spatial resolution of the electronic device; and
   wherein a given pair comprises a given transmit antenna and a given receive antenna.

13. The electronic device of claim 1, wherein the spatial resolution of the electronic device is less than the separations of the first set of transmit antennas or the second set of transmit antennas along the azimuth direction.

14. The electronic device of claim 1, wherein the electronic device is configured to encode electrical signals used to drive the first set of transmit antennas and the second set of transmit antennas so that the electrical signals are orthogonal to each other.

15. A vehicle, comprising an electronic device, wherein the electronic device comprises:
   a circuit board having a first dimension in azimuth direction and a second dimension in an elevation direction;
   one or more transmitters, disposed on the circuit board, configured to provide radar signals having a fundamental wavelength;

one or more receivers, disposed on the circuit board, configured to receive reflected radar signals having the fundamental wavelength;

a first set of transmit antennas disposed on the circuit board and communicatively coupled to the one or more transmitters, wherein the first set of transmit antennas are arranged along the azimuth direction, a given transmit antenna in the first set of transmit antennas has a length along the elevation direction, and separations between adjacent transmit antennas in the first set of transmit antennas along the azimuth direction is greater than one half of the fundamental wavelength;

a first set of receive antennas disposed on the circuit board and communicatively coupled to the one or more receivers, wherein the first set of receive antennas are arranged along the azimuth direction, a given receive antenna in the first set of receive antennas has the length along the elevation direction, and separations between adjacent receive antennas in the first set of receive antennas along the azimuth direction equals one half of the fundamental wavelength;

a second set of transmit antennas disposed on the circuit board and communicatively coupled to the one or more transmitters, wherein the second set of transmit antennas are arranged along a direction that includes components in the azimuth direction and the elevation direction, a given transmit antenna in the second set of transmit antennas has the length along the elevation direction, separations between adjacent transmit antennas in the second set of transmit antennas along the azimuth direction is greater than one half of the fundamental wavelength, and the adjacent transmit antennas in the second set of transmit antennas are partially offset from each other and partially overlap with each other along the elevation direction; and a second set of receive antennas disposed on the circuit board and communicatively coupled to the one or more receivers, wherein the second set of receive antennas are arranged along the direction, a given receive antenna in the second set of receive antennas has the length along the elevation direction, separations between adjacent receive antennas in the second set of receive antennas along the azimuth direction equals one half of the fundamental wavelength, and the adjacent receive antennas in the second set of receive antennas are partially offset from each other and partially overlap with each other along the elevation direction.

16. The vehicle of claim 15, wherein a product of a number of transmit antennas in the second set of transmit antennas and the length along the elevation direction is greater than the second dimension.

17. The vehicle of claim 15, wherein the separations between the adjacent transmit antennas in the first set of transmit antennas or the second set of transmit antennas along the azimuth direction is a non-zero integer multiple of the fundamental wavelength.

18. The vehicle of claim 15, wherein, using the first set of transmit antennas, the first set of receive antennas, the second set of transmit antennas and the second set of receive antennas, the electronic device is configured to produce a virtual antenna array with virtual antennas separated by no more than one half of the fundamental wavelength along the azimuth direction or the elevation direction.

19. The vehicle of claim 15, wherein the electronic device is configured to use the one or more transmitters, the first set of transmit antennas, the second set of transmit antennas, the one or more receivers, the first set of receive antennas and the second set of receive antennas in a multiple-input multiple-output (MIMO) operating mode.

20. A method for performing radar measurements, comprising:

by an electronic device:

providing radar signals by driving a first set of transmit antennas and a second set of transmit antennas using one or more transmitters with electrical signals that are orthogonal to each other, wherein the electrical signals have a fundamental wavelength, wherein the first set of transmit antennas are arranged along an azimuth direction of a circuit board in the electronic device, a given transmit antenna in the first set of transmit antennas has a length along an elevation direction of the circuit board, and separations between adjacent transmit antennas in the first set of transmit antennas along the azimuth direction is greater than one half of the fundamental wavelength, and wherein the second set of transmit antennas are arranged along a direction that includes components in the azimuth direction and the elevation direction, a given transmit antenna in the second set of transmit antennas has the length along the elevation direction, separations between adjacent transmit antennas in the second set of transmit antennas along the azimuth direction is greater than one half of the fundamental wavelength, and the adjacent transmit antennas in the second set of transmit antennas are partially offset from each other and partially overlap with each other along the elevation direction; and receiving, using a first set of receive antennas, a second set of receive antennas and one or more receivers, reflected radar signals having the fundamental wavelength, wherein the first set of receive antennas are arranged along the azimuth direction, a given receive antenna in the first set of receive antennas has the length along the elevation direction, and separations between adjacent receive antennas in the first set of receive antennas along the azimuth direction equals one half of the fundamental wavelength, wherein the second set of receive antennas are arranged along the direction, a given receive antenna in the second set of receive antennas has the length along the elevation direction, separations between adjacent receive antennas in the second set of receive antennas along the azimuth direction equals one half of the fundamental wavelength, and the adjacent receive antennas in the second set of receive antennas are partially offset from each other and partially overlap with each other along the elevation direction, and wherein the one or more transmitters, the first set of transmit antennas, the second set of transmit antennas, the one or more receivers, the first set of receive antennas and the second set of receive antennas are used in a multiple-input multiple-output (MIMO) operating mode to provide a virtual antenna array that enhances a spatial resolution of the electronic device at least along the azimuth direction.

* * * * *